United States Patent [19]
Larson, III

[11] Patent Number: 5,229,933
[45] Date of Patent: Jul. 20, 1993

[54] 2-D PHASED ARRAY ULTRASOUND IMAGING SYSTEM WITH DISTRIBUTED PHASING

[75] Inventor: John D. Larson, III, Palo Alto, Calif.

[73] Assignee: Hewlett-Packard Company, Palo Alto, Calif.

[21] Appl. No.: 442,050

[22] Filed: Nov. 28, 1989

[51] Int. Cl.⁵ .............................................. G06F 15/00
[52] U.S. Cl. ............................... 364/413.25; 367/104; 128/660.01; 128/660.1; 128/661.01
[58] Field of Search .............. 364/413.25; 128/660.01, 128/660.07, 660.08, 660.09, 660.1, 661.01; 367/103, 104; 73/626

[56] References Cited

U.S. PATENT DOCUMENTS

| | | | |
|---|---|---|---|
| 3,911,730 | 10/1975 | Niklas | 73/67.7 |
| 4,041,442 | 8/1977 | Marquerdt | 340/6 R |
| 4,528,854 | 7/1985 | Shimazaki | 128/661.01 |
| 4,550,606 | 11/1985 | Drost | 73/626 |
| 4,662,223 | 5/1987 | Riley et al. | 73/626 |
| 4,730,495 | 3/1988 | Green | 73/620 |
| 4,733,562 | 3/1988 | Saugeon | 128/661.01 |
| 4,945,915 | 8/1990 | Nagasaki | 128/660.07 |
| 4,949,310 | 8/1990 | Smith et al. | 128/660.01 |

Primary Examiner—Roy N. Envall, Jr.
Assistant Examiner—Laura Brutman

[57] ABSTRACT

A two-dimensional phased array ultrasound imaging system distributes signal delays between its probe and its base section. The transducer elements are grouped and relative delays between elements of a group are introduced within the probe. Once the intragroup delays are introduced, the signals from the elements of a group are combined to generate a group signal. A group signal is generated for each group and, collectively, the group signals are transmitted to the base section via a multi-wire cable. Delays between groups are introduced at the base section. This distribution of delays maintains power dissipation within the probe at a tolerable level while requiring only a manageable number of data and signal lines between the probe and base section.

11 Claims, 5 Drawing Sheets

2-D PHASED ARRAY ULTRASOUND IMAGING SYSTEM WITH DISTRIBUTED PHASING

BACKGROUND OF THE INVENTION

The present invention relates to ultrasound systems and, more particularly, to ultrasound imaging systems with transducers comprised of two-dimensional phased arrays. A major objective of the present invention is to provide a two-dimensional phased array ultrasound system with more practicable control of steering and focussing than has heretofore been provided.

Ultrasound imaging systems have proved to be valuable tools for diagnosis in medical applications, as well as for analyses in several non-medical applications. One of the more prominent uses of ultrasound is the monitoring of a fetus during pregnancy. Ultrasonic energy transmitted into a body causes negligible disturbance, while reflections of ultrasound off tissue boundaries can be detected to characterize the internal body structure.

A typical ultrasound imaging system comprises a base unit, a probe, and an interconnecting cable. The electronics module generates an electrical pulse which is conveyed via the cable to the probe and converted to an ultrasonic pulse by a transducer in the probe. When the probe is pressed against a body, the ultrasound pulse is transmitted into the body and is reflected to different degrees at tissue boundaries within the body. The reflections from the various tissue boundaries reach the transducer at different times, depending on their distances from the probe. Typically, the transducer converts the reflections to a time-varying electrical signal. This electrical signal is processed within the base unit to form a video representation of the body being imaged.

Relatively simple ultrasound systems are known which employ spherical or parabolic transducers to transmit and receive ultrasound signals. Generally, these transducers are fixed focus so that their focal range is limited by the depth of focus of the transducer. Small apertures are required to obtain a large depth of field, but are limited to relatively low signal gathering ability and thus limited sensitivity. Provisions are typically made to steer the transducer mechanically to obtain image information over a range of angles. Mechanical steering requires the installation of a bulky motor in the probe and can impose reliability problems.

It is theoretically possible to provide both greater range and high resolution by deforming a transducer to vary its focal length so that a high resolution image is obtained for each of many focal depths. Apparently, it has not been practical to achieve the desired focal length control by mechanically deforming a transducer. On the other hand, "electronic deformation" of phased array transducers, a technology derived from radar, has permitted high-resolution imaging without significant depth-of-field limitations.

Phased array transducers comprise multiple transducer elements arranged in annular, linear or planar arrays. By varying phases, such as by introducing time delays, between elements of an array one can vary the depth of focus dynamically. Thus, a large aperture array transducer can be used to obtain high-resolution imaging and its focal point can be moved to overcome the limitation of a shallow depth of field.

Annular arrays come closest to simulating a mechanically deformable single-element spherical transducer. An annular array comprises multiple annular transducer elements arranged coaxially. As reflections are received by each of the annular elements, each annular element generates a corresponding electrical signal. By controlling the relative delays introduced in these electrical signals, the focal depth of the annular array transducer can be controlled. As with a spherical single-element transducer, an annular array must be mechanically steered to obtain a two-dimensional ultrasound image. The requirement of mechanical steering limits the speed and reliability of the imaging system. In addition, the requirement of a motor and drive train within a probe add mass and bulk to the probe, which should be small and lightweight.

A one-dimensional, e.g., linear, phased array comprises a series of narrow transducer elements arranged side-by-side. By controlling the phasing and relative delays among the elements, such an array can be electronically steered and focused in a steering plane, e.g., which is the azimuthal plane where the linear elements extend vertically. Within this plane, an ultrasound beam is steered and focused to discriminate a desired target from adjacent objects. The elements of a one-dimensional array should be spaced at most $\frac{1}{2}$ the wavelength of the ultrasound signal to avoid grating sidelobe responses which degrade image quality.

A major disadvantage of one-dimensional arrays is that electronic focusing orthogonal to the steering plane, e.g., in the elevation direction, is not provided and resolution is set by the aperture size of the fixed focus acoustical lens. Resolution and signal gathering ability is limited. The elevation plane can only be normal to the array.

Two-dimensional, e.g., planar, array transducers comprise a multitude of small-aperture elements arranged in a two-dimensional array. As with linear array transducers, both focal depth and steering can be effected electronically. In contrast to one-dimensional arrays, steering and focusing can be effected anywhere within a cone-shaped volume in front of the array. Resolution in the elevational direction is provided. Resolution and signal gathering ability are significantly enhanced relative to a one-dimensional array.

However, planar array transducers are not widely implemented due to the large number of separate signal channels, one for each transducer element, which must be processed. For example, given a 5 MHz ultrasound signal, a $\lambda/2$ spaced array with an aperture of 15 mm by 15 mm to provide a resolution of about 1° would require $100 \times 100 = 10,000$ transducer elements. If configured in a conventional manner, 10,000 electronic transmitters, receivers, and interconnect cables would be required. A cable between the probe and the base unit would have to carry over 10,000 lines, which is impracticable. In addition, the cost of a system which such a high component count is prohibitive.

If it were possible to perform the signal processing in the probe itself, only a single signal line would be required from the probe and to the base unit. Power, ground and control lines would still be required, but the number of lines required to be carried by the cable would be greatly reduced. However, this signal processing would require a large number of switches, e.g., for introducing variable delays into each of 10,000 channels. Assuming about 5,000,000 switches are required and that each dissipates about 50 $\mu$W of heat, then 250 Watts would have to be dissipated by the probe. This would be excessive in the absence of some cooling system which would add further to the bulk and power requirements of the probe.

What is needed is an ultrasound imaging system which permits electronic control of both focussing and steering in two dimensions without the limitations in elevational resolution that characterize linear arrays and without the cabling and heat dissipation problems that face large two-dimensional phased array ultrasound imaging systems.

SUMMARY OF THE INVENTION

In accordance with the present invention, the introduction of phasing used to effect steering and focusing is distributed between the probe and the base unit of an ultrasound imaging system. The probe includes a two-dimensional phased array transducer. Elements are grouped and intragroup delays are introduced within the probe. The as-delayed signals of a group are summed and conveyed over a communications link to the base unit. Intergroup delays are introduced at the base unit. Preferably, the intragroup phasings are more finely quantized than the intergroup phasings.

The operation of the invention can be understood in terms of its mechanical metaphor. In both conventional ultrasound systems and in ultrasound systems in accordance with the present invention, phasing is controlled so as to simulate steering and deformation of a spherical (or parabolic) transducer so that its focal length is changed as desired. In conventional two-dimensional phased arrays, i.e., without distributed phasing control, deformation and steering are performed concurrently. With the distributed phase control, intragroup processing steers each group in a desired direction without changing the gross form of the transducer array. This step can be likened to the adjustment of a two-dimensional venetian blind; when a venetian blind is adjusted its basic shape is constant, but its slats (the groups) are reoriented. The groups are oriented toward a common target, but with different focal lengths. Intergroup processing simulates the relative alignment of the groups along the desired spherical surface so that they share a common focal length. Thus, as a first approximation, intragroup processing provides steering and intergroup processing provides focussing.

Preferably, the phasings are introduced in the form of delays, although phased-staggered reference signals can be mixed with the data signals to provide phase offsets as well. The delays can be electrical or acoustical or both. For example, the intragroup delays can be implemented on the elements of the transducer, while intergroup delays can be implemented using summing delay lines.

The bandwidth of the communications link, which can include a cable bearing signal wires, is greatly reduced due to the grouping of the transducer elements and the signals provided therefrom. The processing required to effect the intragroup delays can be selected to maintain heat dissipation within the probe to acceptable levels.

Since bulk and power dissipation are less critical at the base unit, it preferably houses most of the delay control circuitry. In this case, the communications link must also carry control signals from the base unit to the probe. The number of lines required to be carried by the communications link can be reduced by permitting serial transmission of control data to a decoder at the probe which decodes the control data and distributes the decoded control data to switches which route the various transducer signals to appropriate positions on delay elements.

The number of control lines can be further reduced by clustering groups of transducer elements so that groups within a cluster need not be controlled independently. While some loss of close focusing capability is incurred, this loss can be negligible where close focusing is not critical and clusters are selected to have adjacent groups of transducer elements.

Delays are preferably implemented using tapped delay lines in an inverted configuration. Tapped delay lines are typically used with serial inputs and parallel outputs, the latter corresponding to respective amounts of delay. In the context of the present invention, the parallel taps are used as inputs. A transducer signal is directed to the tap corresponding to the desired delay. The serial port of the tapped delay serves as a summing output.

The present invention provides for a wide variety of potential groups. In practice, groups should consist of adjacent elements arranged in square or other rectangular arrays. While the size of the groups should correspond to the size of the total array, a practical range would employ group sizes of $2^2$ to $10^2$ elements. The preferred groups would range from $4^2$ to $7^2$ elements. For arrays on the order of $100^2$, the preferred group size can be between $5^2$ and $6^2$.

The present invention provides for a wide range of trade-offs between probe power usage and transmission link bandwidth. In an exemplary system, a $100 \times 100$ transducer array is grouped into $5 \times 5$ groups, or subarrays. By combining transducer element signals belonging to the same group within the probe, the number of reception channels that the transmission link is required to handle is reduced from 10,000 to 400. At the same time, heat dissipation at the probe is maintained at an acceptable level.

Thus, the present invention provides an ultrasound imaging system with two-dimensional electronic steering as well as practical practical heat dissipation and cable lines count levels. Considerable flexibility is provided to meet the specifications for specific imaging systems. These and other features and advantages of the present invention are described below with reference to the following drawings.

DESCRIPTION OF THE PREFERRED EMBODIMENTS

Figure 1:
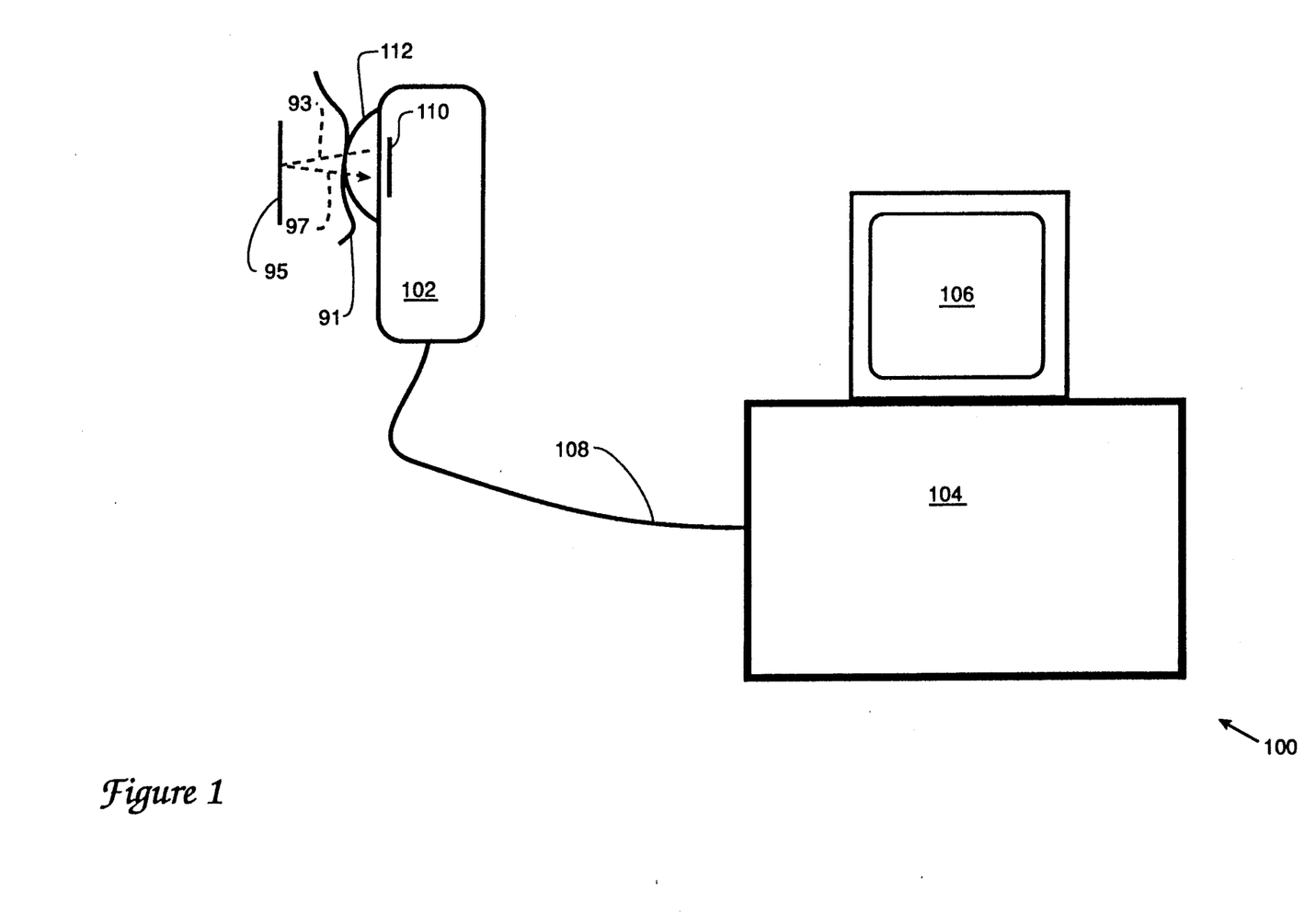
FIG. 1 is a schematic view of an ultrasound imaging system in accordance with the present invention.

An ultrasound system 100 comprises a probe 102, a base unit 104, and a cathode ray tube (CRT) monitor 106. Probe 102 is shown in contact with a body 91. Base unit 104 generates electrical transmit pulses which are amplified and transmitted to probe 102 via a cable 108. The transmit pulses are distributed to individual transducer elements of a two-dimensional phased array 110 within probe 102. The transducer elements convert pulses into an ultrasound beam 93, which is transmitted through a probe window 112 and into body 91. Some of the energy of ultrasound wave 93 is reflected by a tissue boundary 95 to yield ultrasound reflection 97.

Ultrasound reflection 97 is converted into multiple electrical signals by respective transducer elements of array 110. Steering and focusing are effected by introducing relative delays into these multiple signals so that their relative phases are controlled. The phased electrical signals are combined and processed to generate a video signal which yields an image on monitor 106.

Figure 2:
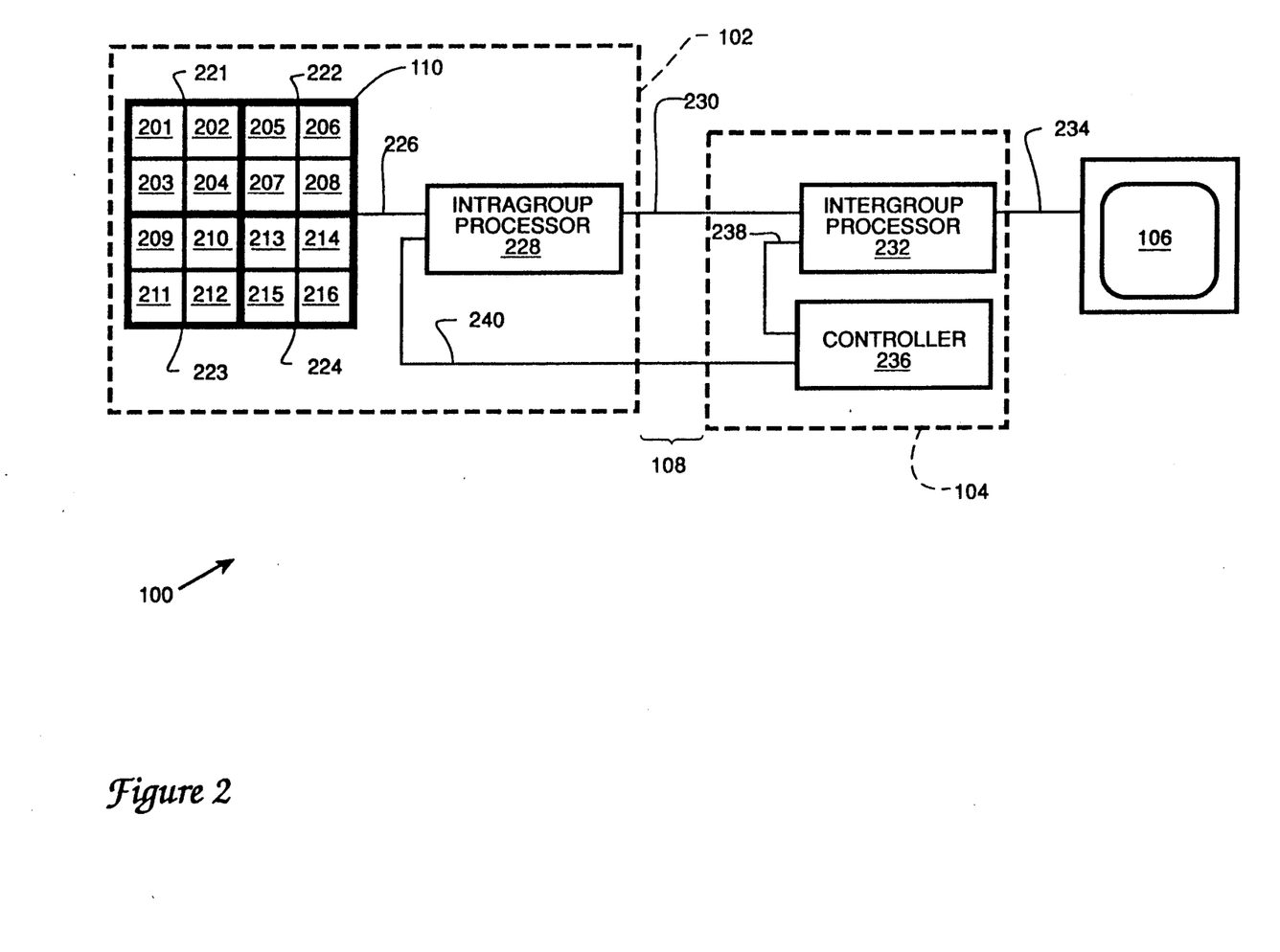
FIG. 2 is a block diagram of the ultrasound imaging system of FIG. 1.

In accordance with the present invention, the delays introduced into the respective electrical signals paths are distributed between probe 102 and base unit 104 as indicated in FIG. 2. Array 110 is a 4×4 array including sixteen transducer elements 201-216 arranged in four 2×2 groups 221-224. While array 110 is too small for most applications, it can facilitate understanding of the signal processing performed by the present invention. Upon reception of reflection 97, array 110 generates 16 electrical signals, one for each transducer element 201-216. These electrical signals are conveyed in parallel along 16-channel bus 226 to intragroup processor 228. Intragroup processor 228 introduces intragroup delays, which can include zero-time delays, into each of the 16 channels and then sums the channels by group to yield four group signals. The four group signals are conveyed to base unit 104 via four-line bus 230 through cable 108.

An intergroup processor 232 introduces intergroup delays, which can also include zero-time delays, in the signal paths for each of the four group signals and then provides for summation for the as-delayed group signals to yield a master signal. Suitable summing delay lines are disclosed in U.S. Pat. No. 4,116,229 to Pering. The master signal is then converted to an appropriate form for display and conveyed along radio frequency line 234 to monitor 106 where the resulting image is presented for viewing.

The intragroup delays introduced within probe 102 and the intergroup delays introduced within base unit 104 are controlled by controller 236 within base unit 104. Controller 236 communicates with intergroup processor 232 over 4-line bus 238 to provide for 16 delay combinations where four group signals are to be routed to four possible delay amounts. Greater precision can be obtained by allowing a finer gradation of delays, in which case a wider bus 238 is used to accommodate the greater number of routings. Controller 236 further provides for selection of intragroup delays via bus 240, as explained below with reference to FIG. 3.

Figure 3:
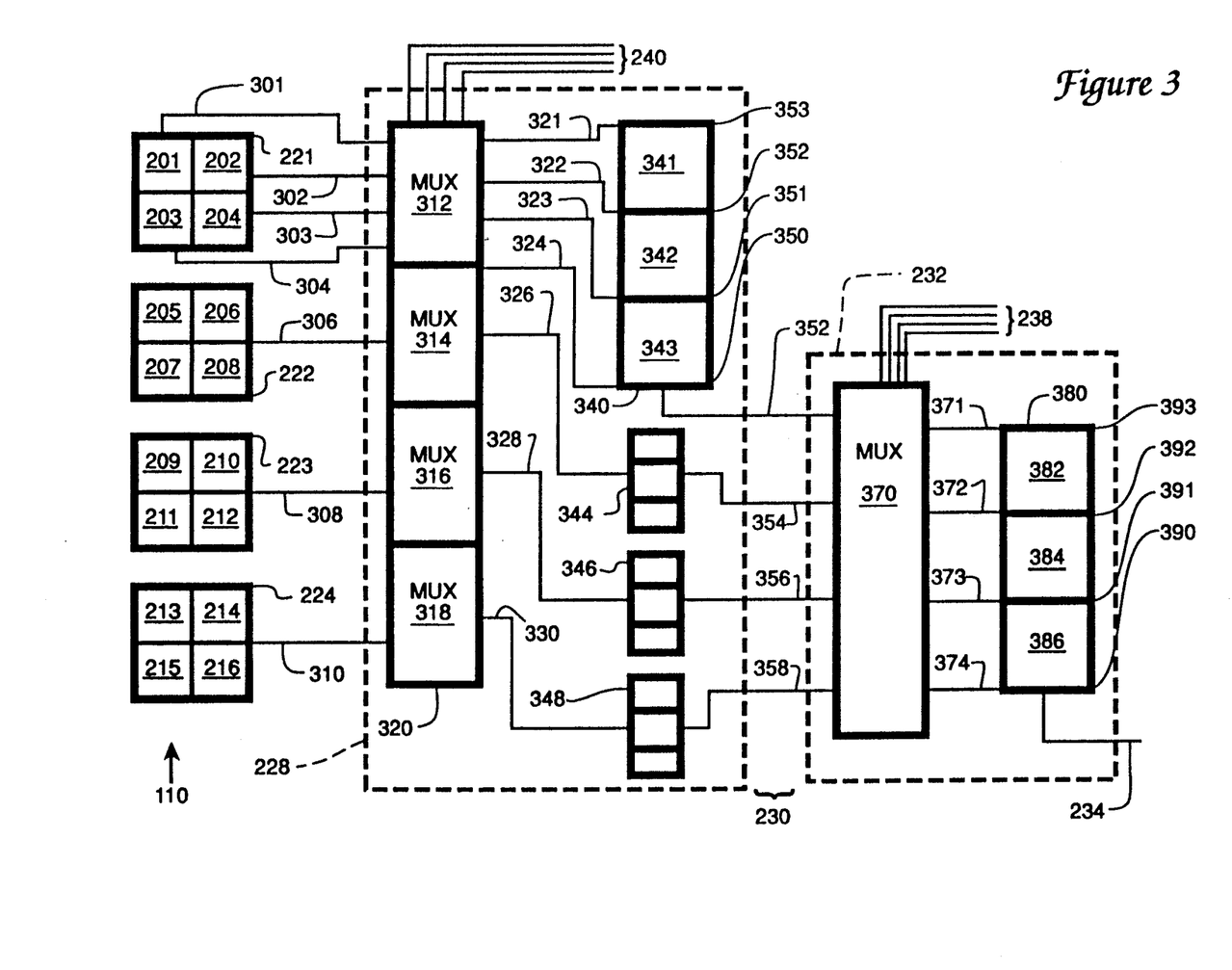
FIG. 3 is a block diagram of the ultrasound imaging system of FIG. 1 with emphasis on the processing for a single group of transducer elements.

As shown in FIG. 3, group 221 is coupled to intragroup processor 228 via four signal lines, 301, 302, 303 and 304, which constitute a signal line bus for group 221. More specifically, transducer element 201 is connected via line 301 to a first input of a 4×4 multiplexer 312; likewise, transducer elements 202-204 are connected via respective signal lines 302-304 to second, third and fourth inputs of multiplexer 312. Similarly, groups 222-224 are connected via respective 4-line buses 306, 308, and 310 to respective multiplexers 314, 316 and 318. Multiplexers 312, 314, 316 and 318 collectively constitute a 4×4×4 multiplexer bank 320.

The purpose of multiplexer bank 320 is to selectively route signal lines from each transducer element 201-216 to paths with different delays. For example, multiplexer 312 has four output lines 321, 322, 323 and 324 which are connected to four taps of a tapped delay line 340. Tapped delay line 340 has three delay segments 341, 342 and 343, each providing one unit of delay and four taps 350, 351, 352 and 353, corresponding respectively to zero delay units, 1 delay unit, 2 delay units and three delay units. Thus, relative delays of 0-3 units can be introduced between the signals from transducer elements 201-204 by appropriately routing lines 301-304 to lines 321-324 as determined by the values received along the four lines of intragroup control bus 240. Delay control is similarly provided for transducer elements 205-216 as multiplexers 314, 316 and 318 provide variable routings along respective four-line output buses 326, 328 and 330 to respective tapped delay lines 344, 346 and 348.

Since all four control lines of bus 240 are required to allow full flexibility in routing group 221, all four multiplexers 312, 314, 316 and 318 are switched in unison. This unison switching limits the close focusing ability of ultrasound system 100. In an alternative embodiment sixteen control lines are used to provide independent routings for each group 221-224 and better close focusing ability. In another embodiment, a single data line is used to communicate a 16-bit serial word to probe 102. This 16-bit word is decoded at probe 102 to provide independent control for the four groups of transducer elements.

In an alternative embodiment of the present invention, a multiplexer bank provides routings to delay lines of different lengths. Once signals are subjected to their respective delays, they are added groupwise, to yield four group signals. By using tapped delay lines, the preferred embodiments avoid the requirement of a separate means for adding the delayed signals from a group.

In the present embodiment, group signals output from delays 340, 344, 346 and 348 are communicated along respective lines 352, 354, 356 and 358, which constitute group signal bus 230, to intergroup processor 232. More specifically, the group signals are provided as four inputs to a 4×4 multiplexer 370 which provides for routings via output lines 371, 372, 373, and 374 to tapped delay line 380. Delay line 380 is similar to delay line 340 in that it includes three delay segments 382, 384 and 386 and four taps 390, 391, 392 and 393. However, since the purpose of delay 380 is to introduce intergroup delays, each of its delay segments is three time units in length. Thus, the total delay of a signal introduced at tap 393 is nine time units. Delay 380 effectively sums the as-delayed group signals, the summed signal being output along rf line 234.

The delay length of intergroup delay line 380 corresponds to the phase variations between transducer elements, e.g., 201 and 216, at opposite extremes of array 110 to achieve a desired steering and focusing range. The delay length of intragroup delay lines 340, 344, 346 and 348 is selected on the phase variations between extreme elements, e.g., 201 and 203, of a group. Generally, the ratio of intergroup to intragroup maximum delays correspond to the ratio of the linear sizes of the total array and an individual group. Intergroup delays segments 382, 384 and 386 are comparable in length to the total delays provided by intragroup delays 340, 344, 346 and 348. Intragroup delay segments, e.g., delay segment 341, is selected so that the delay it introduces corresponds to the steering resolution required of system 100. These relationships are explicated more thoroughly below in the discussion of full-scale embodiments.

Figure 4:
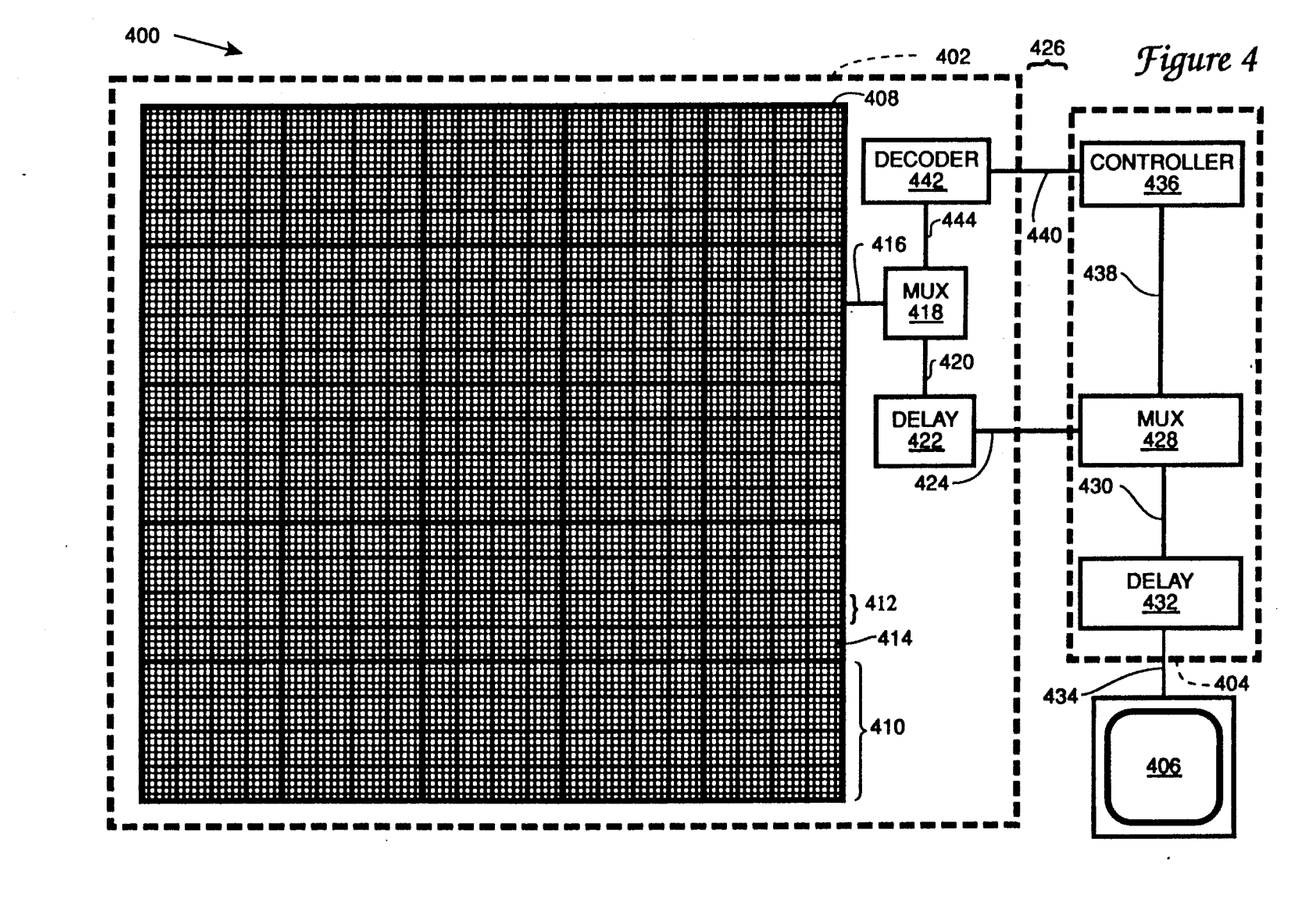
FIG. 4 is a block diagram of an alternative ultrasound imaging system in accordance with the present invention.

The present invention is embodied in a more sophisticated ultrasound imaging system 400, shown in FIG. 4, which includes a probe 402, a base section 404 and a monitor 406. Probe 402 houses a 100×100 array 408, which is shown divided into 25 subarrays or clusters 410, each of which includes sixteen 5×5 groups 412 of transducer elements 414. In all, there are 400 groups 412 and 10,000 transducer elements in array 408. Array 408 is about 18 mm square to provide about 1° resolution in two dimensions. This corresponds to transducer element pitch of about 180 μm or about 0.6λ, which is a slight undersampling. Array 408 is concave and has a 50 mm radius of curvature to prefocus the array within the region of interest so as to minimize the number of active elements required. Alternatively, a flat and convex arrays can be used.

Ultrasound reflections incident on array 408 are converted into 10,000 electrical signals which are routed by a signal bus 416 to a intragroup multiplexer bank 418 of 400 multiplexers comprising 400 25×6 multiplexers. Each group of 25 electrical signals is routed via a bus 420 to a respective delay of delay bank 422 of five-segment delays. Each delay provides six alternative relative delays, i.e., 0, 1, 2, 3, 4, and 5 delay units which can be applied in any permutation to the respective 25 signals. Each delay provides a maximum of 250 nanoseconds (ns), so that the unit delay, i.e., delay quantization, is 50 ns. The as-delayed signals of each group are summed to yield a group signal so that 400 group signals are transmitted over a bus 424, which is carried by a cable 426 to base unit 404.

The 400 group signals received by base unit 404 are received at a 400:1 multiplexer 428 which routes, via a bus 430, the group signals to a fifty-segment delay 432. Delay 432 introduces one of fifty-one levels of relative delay into each group signal and yields a sum signal, which is converted to a video signal. Each segment of delay 432 provides 250 ns of delay so that the maximum delay provided by delay 432 is 12,500 ns. The video signal is transmitted along video bus 434 to monitor 406, resulting in an image display.

Coordination of the video image with the focusing and steering of the ultrasound beam received by array 408 is performed by controller 436 within base unit 404. Controller 436 controls multiplexer 428 via a control bus 438 and controls multiplexer bank 422 via control bus 440, which is carried by cable 426.

Complete specification for the routings provided by multiplexer bank 418 requires 60,000 bits of information. Since the relative delays introduced between corresponding elements of nearby groups differ at most by small amounts, a second level of grouping can be used to reduce the amount of information required from controller 436 to control multiplexer bank 418. Specifically, controller 436 sends common control signals along bus 440 to govern groups within a cluster 410. This reduces by a factor of sixteen the number of bits which must be carried by bus 440 so that 3750 bits are required to control multiplexer bank 418. These 3750 bits can be carried by 234 lines, each carrying sixteen bits in series for selecting each focusing and steering position. These 234 data lines do not unduly add to the bulk of cable 426, which is also carrying the 400 group signal lines as well as other necessary lines, such as power and ground.

The information carried by bus 440 is decoded by decoder 442, which can comprise a microprocessor for each data line. The decoded information is conveyed along bit-line bus 444 to multiplexer bank 418.

For each group 412, 150 switches are required to provide 6 levels of delay for 25 transducer elements 414. Thus 60,000 switches are required in probe 402 to handle all 400 groups. In addition, 6 input buffers and one output buffer are required for each of the 400 delay segments so that probe 402 requires 2800 buffers for the delays. These components yield about 15 Watts power dissipation at 5 volts, which is readily handled by probe 102. A dynamic range of 60 dB is provided. Azimuthal steering is ±45° resolved into 150 lines. Elevational steering is ±45° resolved into 100 elevational planes. A focal range from 30 mm to 150 mm is provided.

While relative phasings between channels is implemented using delay lines in ultrasound system 100, it is also possible to implement relative phasing by mixing staggered reference signals with respective image signals. The mixers are readily integrated with the signal switches. The technology for implementing relative phasings in an ultrasound system is disclosed in U.S. Pat. No. 4,140,022 to Maslak.

Figure 5:
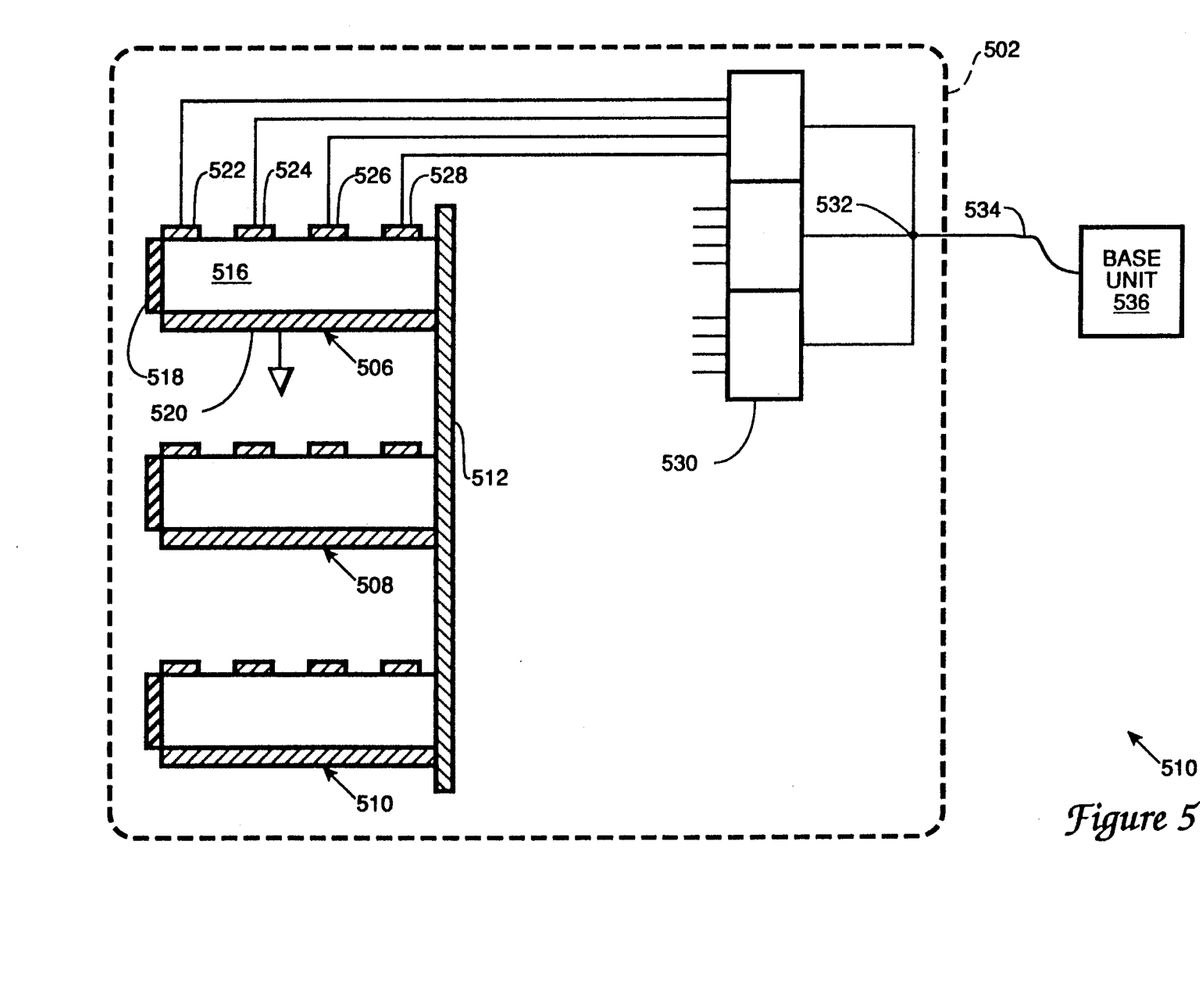
FIG. 5 is a schematic of an acoustic intragroup delay configuration in accordance with the present invention.

A alternative ultrasound system 500 provides for the introduction of delays in acoustic image signals prior to conversion to electrical form, as indicated in FIG. 5. A probe 502 includes multiple transducer elements 506, 508 and 510 are mounted on a common backplane 512. Each transducer element is a side-electrode, longitudinally polled, bar thickness mode transducer. Each element includes a substrate 516 with a matching layer 518 for receiving acoustic image signals. A ground plane 520 is formed on one side of element 506, while four electrodes 522, 524, 526 and 528 are formed on the opposing side of element 506. Each electrode serves as a tap off of elongated transducer element 506. Each tap provides a image signal with a respective delay introduced. A bank 530 of 4×1 multiplexers is used to select a desired delay for each transducer element. The selected signals the elements of a group are summed at a node 532. The summed signal from node 532 is then sent along a cable 534 to a base unit 536, at which intergroup processing is implemented. In other respects, ultrasound system 500 is similar to systems 100 and 400.

Thus, the present invention provides for reasonable power dissipation levels within a probe along with a manageable number of lines within a cable from a probe to a base unit. Different size arrays can also be provided for. Each array can be divided into groups and subarrays of different shapes, e.g., non-square rectangles, and numbers of elements. For example, while 5×5 groups are described, 6×6 groups would be suitable for a comparable array provided the array size is commensurable with the group size. For example, a 96×96 can be conveniently divided into 6×6 groups. Smaller arrays incorporate 4×4 groups, while larger arrays incorporate 7×7 groups.

A formalization is provided below to enable optimization of ultrasound systems for a wide range of array dimensions. In general, it is desirable to minimize the number of switches in the probe and the number of cables between the probe and the base unit. The ultimate criteria, which include the manufacturing costs as well as system performance and convenience, are not all easily quantifiable. Therefore, the formalization below is presented as a guideline which can be modified as more precise quantifications of performance and convenience can be applied.

The formalization seeks to minimize the total number of switches in the probe and the base unit. Since the number of switches in the base unit correlates with the number of cables to the probe, this objective is related to the goal of minimizing both switches in the probe and cables from the probe. The formalization applies the following definitions.

$N^2$ is the total number of elements in the array.
$K^2$ is the number of elements in a group of the array.
$Q_1$ is the quantum of delay on an element.
A is the number of delay levels on an element.
B is the number of summing delay steps.
$T_D$ is the total delay range (focus+steer).
$N_T$ is the total number of switches.

The following quantities can be calculated.
$B = T_D/AQ_1$
$N^2/K^2$ is the number of groups and wires to the scanner.
$(A+1)K^2$ is the number of crosspoint switches in one group.
$(A+1)N^2$ is the number of crosspoint switches in the probe.
$(N^2/K^2)(T_D/AQ_1)$ is the number of summing delay line tap selector switches.

The objective is to minimize:

$$N_T = (N^2)[(A+1)+(T_D/Q_1)/(AK^2)]$$

By applying a steering constraint of $K \sim (0.83)A$ (see subsequent justification), the following solution can be obtained:

$$A_{min} = [4.32\, T_D/Q_1]^{\frac{1}{3}}.$$

For example, for a total delay of $T_D = 15,000$ ns and a quantization of $Q_1 = 50$ ns, the total number of delay levels is $A_{min} = 6$.

To calculate the desired group size based on $A_{min}$, a steering constraint must be considered. An incoming ultrasound wave is steered off axis to an array. A time delay $\Delta\tau$ between adjacent elements, spaced a distance d apart, must be established to compensate the differential time delay experienced on each element due to an incoming wave from a specified steering angle $\theta, \Psi$. In this case:

$$\Delta\tau = (d\sin\theta\sin\Psi)/v.$$

The total delay time across a group should be no larger than the maximum delay quantization:

$$AQ_1 \leq K\Delta\tau$$

and therefore:

$$K \approx (AQ_1/\Delta\tau) \approx 0.83\, A.$$

In the example above, $A_{min} = 6$ so $K_{min}$ is 5. In this case, there are about 70,000 switches per group and 20,160 tap selector switches, yielding a total of 90,160 switches. The number of groups, and thus buffer amplifiers and wires to the base unit, are 400. Seven switches are connected to each element. Electrical cross coupling is about $-61$ dB assuming an element capacitance of 6.5 pF and a leakage capacitance of 1.E-3 pF.

The number of wires required between the probe and base unit includes signal wires from the probe to the base unit plus the control wires from the base unit to the probe. If the groups are grouped into supergroups of M groups each there are $MAK^2$ possible choices of delay, element pairs. The number of control lines and the number of bits per control line can be calculated as follows.

\# of bits = log $MAK^2$/log(2)
\# of control lines = $(1/M)(N^2/K^2)$.

Where, for example, $M=2$ and the number of control lines per supergroup is 1, $A_{min}=6$ and $K_{min}=5$, there are 300 choices of delay, element pairs and 200 9-bit control lines are required. Where, instead, $M=16$ and the number of control lines per supergroup is 2, $A_{min}=6$ and $K_{min}=5$, there are 2400 choices of delay, element pairs and 25 12-bit control lines are required. The number of signal lines is 400. In the $M=2$ case, the number of cable lines is about 600 and in the $M=16$ case the number of cable wires is about 425.

In another example, $M=16$ and the number of control lines per supergroup is 2, $A_{min}=7$ and $K_{min}=6$, there are 4032 choices of delay, element pairs and 18 12-bit control lines and 278 signal wires are required. In practice, 18 16-bit control lines are used for compatibility with widely available 16-bit processors. Eighteen 16-bit processors are located on the probe to control about 70,000 delay select switches. About 278 buffer amplifiers are used to drive analog leads to the scanner base unit. Other embodiments employ hierarchical switching within the probe to further reduce the number of switches required, and thus the power dissipation, in the probe. Different types of delays can be used and different numbers of delay quanta can be used, both within the probe and in the base unit. Other variations upon and modifications to the disclosed embodiments are provided by the present invention, the scope of which is limited only by the following claims.

What is claimed is:

1. An ultrasonic imaging system comprising:
   a probe, a base station, and a communications link coupling said probe and said base section;
   said probe including an ultrasound transducer having plural groups of plural transducer elements arranged in a two-dimensional array, each of said transducer elements being capable of converting an image signal from acoustic form to electrical form, said probe including intragroup processing means for controlling relative intragroup phasings between respective image signals corresponding to the elements of a group and combining the image signals of a group so phased into a group signal so as to generate plural group signals corresponding to respective ones of said plural groups, said intragroup processor providing for transmitting said group signals to said base section via said communications link;
   said based section including intergroup processing means for controlling intergroup phasings between said group signals and combining said group signals so delayed so as to generate a video signal;
   whereby introduction of intragroup delays by said intragroup phasings and introduction of intergroup delays by said intergroup phasings provide for steering and focussing of said ultrasonic imaging system.

2. A system as recited in claim 1 wherein said base section further comprises intragroup control means for generating intragroup phase control signals and transmitting them to said intragroup processing means via said communications link, said intragroup processing means providing for reception of said intragroup phase control signals, said intragroup processing means introducing said relative phases as a function of said intragroup phase control signals.

3. A system as recited in claim 1 wherein the number of elements in each group is between $2^2$ and $10^2$.

4. A system as recited in claim 1 wherein the number of elements in each group is between $4^2$ and $7^2$.

5. A system as recited in claim 4 wherein each group comprises twenty-five elements arranged in a $5 \times 5$ array.

6. A system as recited in claim 4 wherein each group comprises a $4 \times 4$ array of transducer elements.

7. A system as recited in claim 1 wherein the number of said transducer elements is between $50^2$ and $200^2$ and the number of elements in each group is between $4^2$ and $7^2$.

8. A system as recited in claim 7 wherein said transducer comprises 10,000 transducer elements arranged in a $100 \times 100$ array, each of said groups being a $5 \times 5$ group of transducer elements so that 400 group signals are transmitted via said communications link to said base section, said communication link being a flexible cable.

9. A system as recited in claim 1 wherein said intragroup processing means includes multiple-input tapped delay lines so that desired delays can be introduced into respective ones of said image signals from transducer elements of a group as these processable signals are being summed.

10. A system as recited in claim 1 wherein said intragroup processing means includes multiple-input tapped delay lines each of which is associated with a respective of said groups, the relative delay introduced into a given processable signal being a function of the delay line input through which it is introduced into a respective one of said multiple-input tapped delay line, the output of said multiple-input delay line being the sum of the processable signals provided by the transducer elements of the respective group with the desired relative delays.

11. A system as recited in claim 1 wherein said transducer elements have multiple taps, said intragroup processing means including multiplexer banks of multiplexers, each multiplexer serving to select one tap from a respective transducer element, the outputs of the multiplexers of each bank being summed to provide a sum signal of relatively phased image signals.

* * * * *